(12) United States Patent
Hanrahan

(10) Patent No.: US 10,731,510 B2
(45) Date of Patent: Aug. 4, 2020

(54) GAS TURBINE ENGINE WITH FLUID DAMPER

(71) Applicant: United Technologies Corporation, Hartford, CT (US)

(72) Inventor: Paul R. Hanrahan, Farmington, CT (US)

(73) Assignee: RAYTHON TECHNOLOGIES GROUP, Farmington, CT (US)

(*) Notice: Subject to any disclaimer, the term of this patent is extended or adjusted under 35 U.S.C. 154(b) by 941 days.

(21) Appl. No.: 14/707,227

(22) Filed: May 8, 2015

(65) Prior Publication Data

US 2015/0330251 A1 Nov. 19, 2015

Related U.S. Application Data

(60) Provisional application No. 61/994,290, filed on May 16, 2014.

(51) Int. Cl.
| | | |
|---|---|---|
| F16C 27/04 | (2006.01) | |
| F01D 25/16 | (2006.01) | |
| F01D 1/18 | (2006.01) | |
| F01D 25/20 | (2006.01) | |
| F16C 19/26 | (2006.01) | |

(52) U.S. Cl.
CPC .............. *F01D 25/162* (2013.01); *F01D 1/18* (2013.01); *F01D 25/164* (2013.01); *F01D 25/20* (2013.01); *F16C 27/045* (2013.01); *F16C 19/26* (2013.01); *F16C 2360/23* (2013.01)

(58) Field of Classification Search
CPC ...... F01D 25/162; F01D 25/164; F01D 25/20; F16C 27/045
See application file for complete search history.

(56) References Cited

U.S. PATENT DOCUMENTS

| | | | |
|---|---|---|---|
| 4,213,661 A | 7/1980 | Marmol | |
| 4,679,464 A | 7/1987 | Castellani | |
| 4,693,616 A * | 9/1987 | Rohra | F01D 25/164 |
| | | | 384/99 |
| 5,344,239 A | 9/1994 | Stallone | |
| 5,433,674 A | 7/1995 | Sheridan et al. | |
| 5,460,489 A | 10/1995 | Benjamin et al. | |
| 5,651,616 A | 7/1997 | Hustak | |

(Continued)

FOREIGN PATENT DOCUMENTS

| | | |
|---|---|---|
| EP | 1806491 | 7/2007 |
| EP | 1808580 | 7/2007 |

(Continued)

OTHER PUBLICATIONS

Extended European Search Report for European Application No. 15001480.1 dated Sep. 10, 2015.

*Primary Examiner* — Justin D Seabe
(74) *Attorney, Agent, or Firm* — Carlson, Gaskey & Olds, P.C.

(57) ABSTRACT

A gas turbine engine includes a static structure which includes a first fluid passage and a rotatable shaft. A bearing assembly supports the rotatable shaft relative to the static structure. The bearing assembly includes an outer race with a damper passage that extends between the static structure and the outer race. A second fluid passage extends from the damper passage to a seal.

17 Claims, 3 Drawing Sheets

(56) References Cited

U.S. PATENT DOCUMENTS

| | | | | |
|---|---|---|---|---|
| 6,325,546 | B1* | 12/2001 | Storace | F01D 21/04 |
| | | | | 384/536 |
| 6,439,772 | B1* | 8/2002 | Ommundson | F01D 25/164 |
| | | | | 29/889.2 |
| 6,872,003 | B2* | 3/2005 | Dusserre-Telmon | ........ |
| | | | | F01D 25/164 |
| | | | | 384/99 |
| 7,574,854 | B2* | 8/2009 | Moniz | F01D 25/164 |
| | | | | 384/474 |
| 7,704,178 | B2 | 4/2010 | Sheridan et al. | |
| 7,731,426 | B2* | 6/2010 | Meacham | F01D 25/164 |
| | | | | 384/311 |
| 8,167,494 | B2* | 5/2012 | Gibbons | F01D 25/164 |
| | | | | 384/99 |
| 8,342,796 | B2* | 1/2013 | Spencer | F01D 25/164 |
| | | | | 384/99 |
| 8,511,055 | B2 | 8/2013 | DiBenedetto et al. | |
| 8,529,197 | B1 | 9/2013 | Coffin et al. | |
| 2007/0157596 | A1 | 7/2007 | Moniz | |
| 2010/0034657 | A1 | 2/2010 | Hunt et al. | |
| 2011/0123326 | A1 | 5/2011 | DiBenedetto et al. | |
| 2012/0099969 | A1 | 4/2012 | Gilman | |
| 2012/0328431 | A1* | 12/2012 | Davis | F01D 25/164 |
| | | | | 415/229 |

FOREIGN PATENT DOCUMENTS

| | | |
|---|---|---|
| EP | 2113639 | 11/2009 |
| EP | 2505790 | 10/2012 |

\* cited by examiner

GAS TURBINE ENGINE WITH FLUID DAMPER

CROSS-REFERENCE TO RELATED APPLICATIONS

This application claims priority to U.S. Provisional Application No. 61/994,290, which was filed on May 16, 2014 and is incorporated herein by reference.

BACKGROUND

This application relates to a system for distributing fluid to a damper in a gas turbine engine.

A gas turbine engine typically includes a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and a fan section or other loads.

Shafts connecting the various sections of the gas turbine engine are subject to vibrations. The shafts are generally supported by bearings which tend to be relatively stiff and transfer vibrations through the gas turbine engine. To reduce engine vibration and any potential damage to the engine caused by the vibrations, dampers are placed at various locations in the gas turbine engine. One type of damper used to counteract the vibrations is a fluid damper which includes a thin film of fluid between two adjacent closely spaced elements. Fluid is generally provided to the fluid damper by a hydraulic system powered by the gas turbine engine.

SUMMARY

In one exemplary embodiment, a gas turbine engine includes a static structure which includes a first fluid passage and a rotatable shaft. A bearing assembly supports the rotatable shaft relative to the static structure. The bearing assembly includes an outer race with a damper passage that extends between the static structure and the outer race. A second fluid passage extends from the damper passage to a seal.

In a further embodiment of the above, the bearing assembly includes an inner race that is attached to the rotating shaft.

In a further embodiment of any of the above, a first seal is between the outer race and the static structure and defines a forward edge of the damper passage. A second seal is between the inner race and the static structure and defining an aft edge of the damper passage.

In a further embodiment of any of the above, the damper passage is configured to contain a film of fluid.

In a further embodiment of any of the above, the rotatable shaft is an inner shaft.

In a further embodiment of any of the above, the bearing assembly is an inner shaft support bearing.

In a further embodiment of any of the above, a flange is attached to the static structure and multiple fingers extend between the flange and the outer race.

In a further embodiment of any of the above, the seal is a carbon seal.

In a further embodiment of any of the above, the first fluid passage is fluidly connected to the second fluid passage.

In a further embodiment of any of the above, a plenum is located between the first fluid passage and the second fluid passage.

In a further embodiment of any of the above, the second fluid passage extends radially inward and downstream.

In a further embodiment of any of the above, there is a pump for pumping a fluid through the first fluid passage and the second fluid passage.

In a further embodiment of any of the above, the outer race is attached to the static structure.

In a further embodiment of any of the above, there is a damper housing. The second fluid passage extends through the damper housing.

In another exemplary embodiment, a method of distributing a fluid in a gas turbine engine includes pumping a fluid through a first fluid passage to pressurize a damper passage located between an outer race of a bearing assembly and a static structure and directing the fluid from the damper passage through a second fluid passage in the outer race to lubricate a seal.

In a further embodiment of the above, the first fluid passage extends through the static structure.

In a further embodiment of any of the above, an outlet to the second fluid passage is adjacent the seal.

In a further embodiment of any of the above, a first seal is between the outer race and the static structure and defines a forward edge of the damper passage. A second seal is between the inner race and the static structure and defines an aft edge of the damper passage.

In a further embodiment of any of the above, the method includes forming a film of fluid in the damper passage.

In a further embodiment of any of the above, the method includes dampening a vibration traveling through the bearing assembly in the gas turbine engine with the film formed in the damper passage.

DETAILED DESCRIPTION

Figure 1:
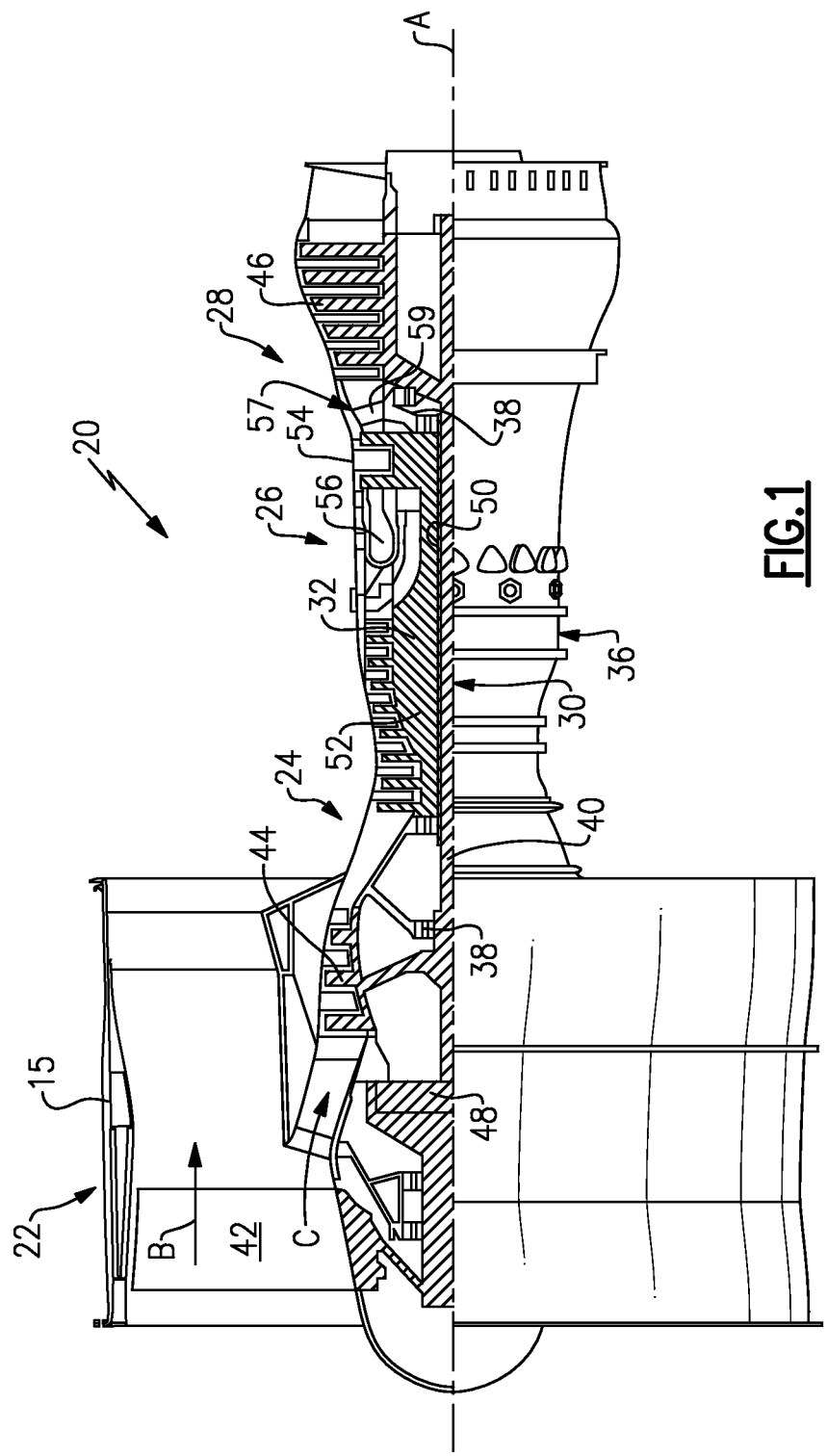
FIG. 1 shows a schematic view schematic view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including one-spool and three-spool architectures, as well as industrial gas turbine engines.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{R})/(518.7° \text{R})]^{0.5}$. The "Low corrected fan tip speed" as disclosed herein according to one non-limiting embodiment is less than about 1150 ft/second (350.5 meters/second).

Figure 2:
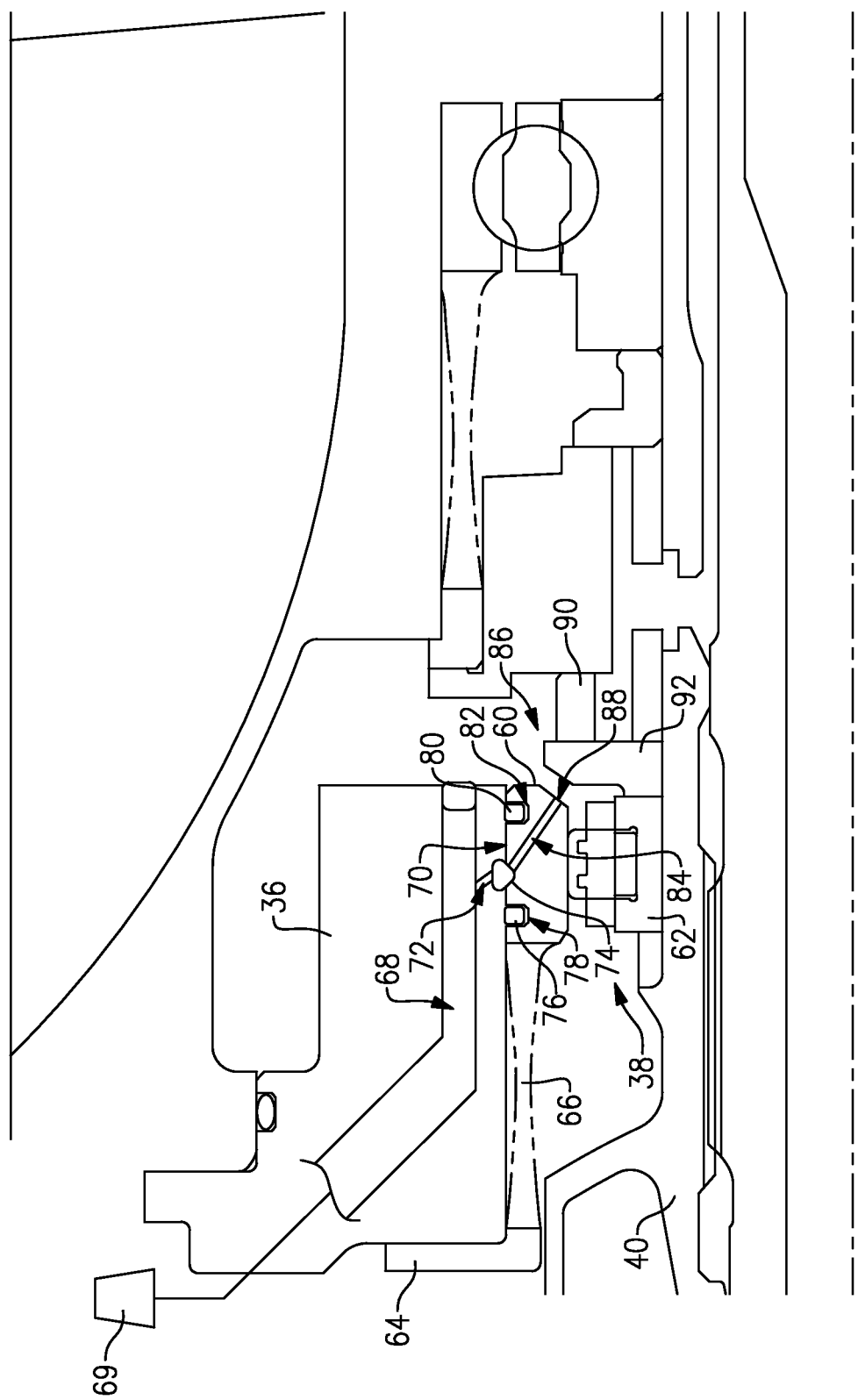
FIG. 2 shows an enlarged view of a bearing assembly.

FIG. 2 shows an enlarged view of the bearing system 38 connecting the inner shaft 40 that drives the fan 42 with the static structure 36. In this example, the bearing system 38 is a number two bearing. However, this invention disclosure could also apply to other bearing assemblies such as a number eight bearing. The bearing system 38 includes an outer race 60 that is attached to the static structure 36 and fixed from rotation and an inner race 62 that rotates with the inner shaft 40. A damper passage 70 is located between the outer race 60 and the static structure 36 to allow a thin film of fluid to form between the outer race 60 and the static structure 36. The damper passage 70 reduces the vibrations that can travel through the bearing systems 38 by absorbing at least a portion of the vibrations in the fluid.

Multiple bearings, such as roller bearings, ball bearings, or tapered bearings, are located between the inner race 62 and the outer race 60 to allow for rotation between the inner race 62 and the outer race 60.

A flange 64 is attached to the static structure 36 and multiple fingers 66 extend between the flange 64 and the outer race 60 to help maintain an axial position of the outer race 60 and the bearing system 38.

The static structure 36 includes a fluid passage 68 for transporting a fluid, such as a lubricant, throughout the gas turbine engine 20. The fluid passage 68 provides fluid to the damper passage 70 through a passage 72. A plenum 74 is located in the damper passage 70 to distribute the fluid through the damper passage 70. A forward edge of the damper passage 70 is defined by a first circumferentially extending seal 76 located in a slot 78 in the outer race 60. A rearward edge of the damper passage 70 is defined by a second circumferentially extending seal 80 located in a slot 82. Because there is minimal relative movement between the static structure 36 and the outer race 60, a temperature of the fluid passing through the damper passage 70 does not increase significantly.

After the fluid has entered the damper passage 70, the fluid can then travel through a passage 84 in the outer race 60. The passage 84 extends from the damper passage 70 adjacent the plenum 74 in a radially inward and downstream direction until the passage 84 reaches an outlet 88 on the outer race 60. The outlet 88 is adjacent a seal 86. The seal 86 in this example is a carbon seal and includes a stationary portion 90 and a rotating portion 92. The fluid exiting the outlet 88 contacts the seal 86 to lubricate the seal 86. A pump 69 pumps fluid through the fluid passage 68, the passage 72, the damper passage 70, and the passage 84.

By utilizing the fluid in the damper passage 70 to also lubricate the seal 86, the fluid passageways in the gas turbine engine can be simplified because the damper passage 70 and the seal 86 no longer require separate passages. The fluid from the damper passage 70 can be used to lubricate the seal 86 after leaving the damper passage 70 because the fluid in the damper passage 70 is not exposed to a significant amount of heat that would prevent the fluid from being used to lubricate the seal 86.

Figure 3:
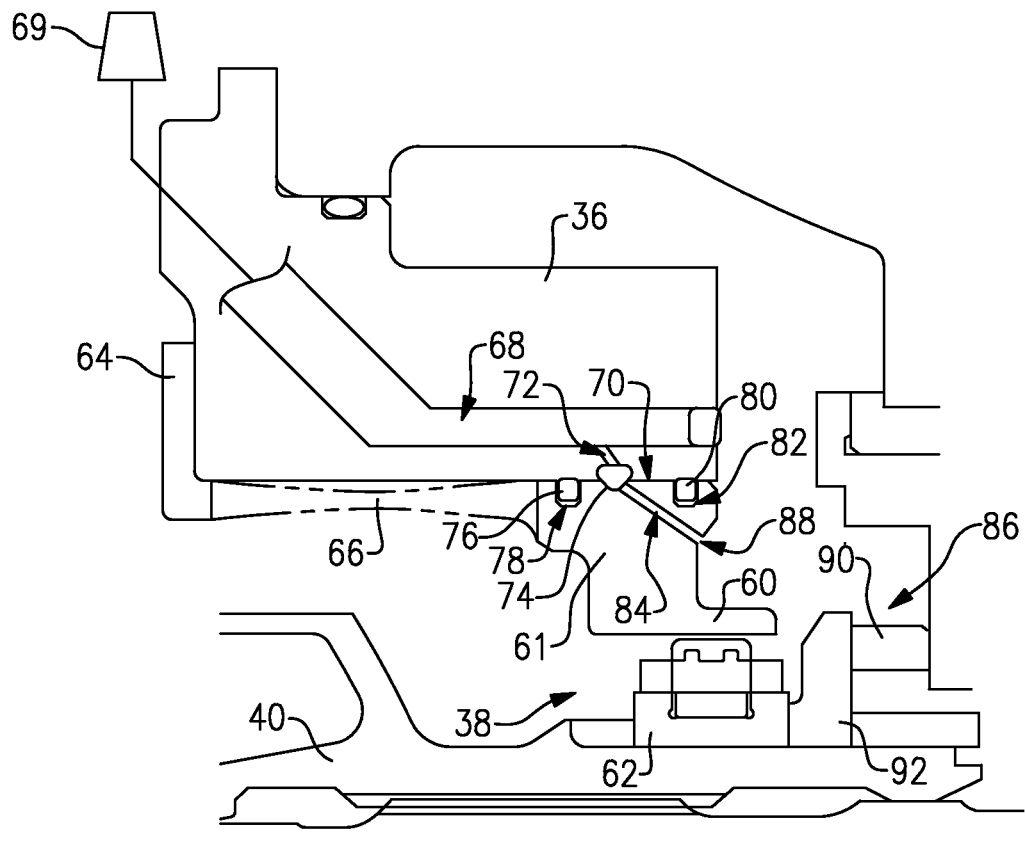
FIG. 3 shows an enlarged view of another bearing assembly.

FIG. 3 shows another example embodiment of the bearing system 38 with the damper passage 70 similar to the embodiment shown in FIG. 2 except where described below or shown in the Figures. The outer race 60 is attached to a damper housing 61 located adjacent the static structure 36. The damper passage 70 is located between the static structure 36 and the damper housing 61.

After the fluid has entered the damper passage 70, the fluid can then travel through a passage 84 in the damper housing 61. The passage 84 extends from the damper passage 70 adjacent the plenum 74 in a radially inward and downstream direction until the passage 84 reaches an outlet 88 on the damper housing 61. The outlet 88 is adjacent the seal 86.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine comprising:
   a static structure including a first fluid passage, the first fluid passage extending continuously through the static structure between an inlet and an outlet of the first fluid passage;
   a rotatable shaft;
   a bearing assembly supporting the rotatable shaft relative to the static structure, the bearing assembly including an outer race with a damper passage at least partially defined by the static structure and the outer race with the outlet of the first fluid passage located at an interface with the damper passage and radially outward from the damper passage;
   a flange attached to the static structure and multiple fingers engaging the flange and the outer race, wherein the flange engages a flange contact surface on the static structure with the flange contact surface located axially forward of the first fluid passage in the static structure and the multiple fingers engage the flange and the outer race;
   a first seal directly contacting the outer race and the static structure defining a forward edge of the damper passage;
   a second seal directly contacting the outer race and the static structure defining an aft edge of the damper passage; and
   a second fluid passage extending through the outer race from the damper passage to a seal.

2. The gas turbine engine of claim 1, wherein the bearing assembly includes an inner race attached to the rotating shaft.

3. The gas turbine engine of claim 1, wherein the damper passage is configured to contain a film of fluid.

4. The gas turbine engine of claim 1, wherein the rotatable shaft is an inner shaft mechanically connected to a fan through a speed change device.

5. The gas turbine engine of claim 1, wherein the bearing assembly is an inner shaft support bearing and the inner shaft is driven by a low pressure turbine and connected to a fan through a speed change device.

6. The gas turbine engine of claim 1, wherein the seal is a carbon seal and the carbon seal includes a stationary portion and a portion that rotates with the rotatable shaft.

7. The gas turbine engine of claim 1, wherein the first fluid passage is fluidly connected to the second fluid passage and the first fluid passage is in an axial overlapping alignment with the outer race.

8. The gas turbine engine of claim 1, including a plenum located between the first fluid passage and the second fluid passage, wherein the plenum is defined by a radially inner side of the static structure and a radially outer side of the outer race and an outlet of the first fluid passage is located radially outward of the plenum.

9. The gas turbine engine of claim 8, wherein the second fluid passage extends radially inward and downstream from the plenum.

10. The gas turbine engine of claim 1, including a pump for pumping a fluid through the first fluid passage and the second fluid passage.

11. The gas turbine engine of claim 1, wherein the inlet and the outlet of the first fluid passage is fluidly is in an axial overlapping alignment with the outer race.

12. The gas turbine engine of claim 1, including a fluid supply passage extending through the static structure and the first fluid passage branches off of the fluid supply passage.

13. A method of distributing a fluid in a gas turbine engine comprising:
   pumping a fluid through a first fluid passage to pressurize a damper passage at least partially defined by an outer race of a bearing assembly and a static structure, wherein the first fluid passage extends through the static structure, a first seal directly contacts the outer race and the static structure defining a forward edge of the damper passage and a second seal directly contacts the outer race and the static structure defining an aft edge of the damper passage, a flange is attached to the static structure, and multiple fingers engage the flange and the outer race, and the flange engages a flange contact surface on the static structure with the flange contact surface located axially forward of the first fluid passage in the static structure and the multiple fingers engage the flange and the outer race; and
   directing the fluid from the damper passage through a second fluid passage extending through the outer race to lubricate a seal.

14. The method as recited in claim 13, wherein an outlet to the second fluid passage is adjacent the seal and the first fluid passage extends continuously through the static structure between an inlet and an outlet of the first fluid passage and the first fluid passage is in an axial overlapping alignment with the outer race.

15. The method as recited in claim 13, including forming a film of fluid in the damper passage while rotating an inner shaft mechanically connected to a fan through a speed change device.

16. The method as recited in claim 15, including dampening a vibration traveling through the bearing assembly in the gas turbine engine with the film formed in the damper passage.

17. The method of claim 13, including collecting the fluid in a plenum located between the first fluid passage and the second fluid passage, wherein the plenum is at least partially defined by the static structure on a radially outer side and the outer race on a radially inner side and the second fluid passage extends radially inward and downstream from the plenum and the plenum is entirely axially inward from opposing axial ends of the outer race and an outlet of the first fluid passage is located radially outward from the plenum.

\* \* \* \* \*